Aug. 29, 1967    J. GOULD ET AL    3,338,590
BABY CARRIER
Filed May 18, 1965    4 Sheets-Sheet 3
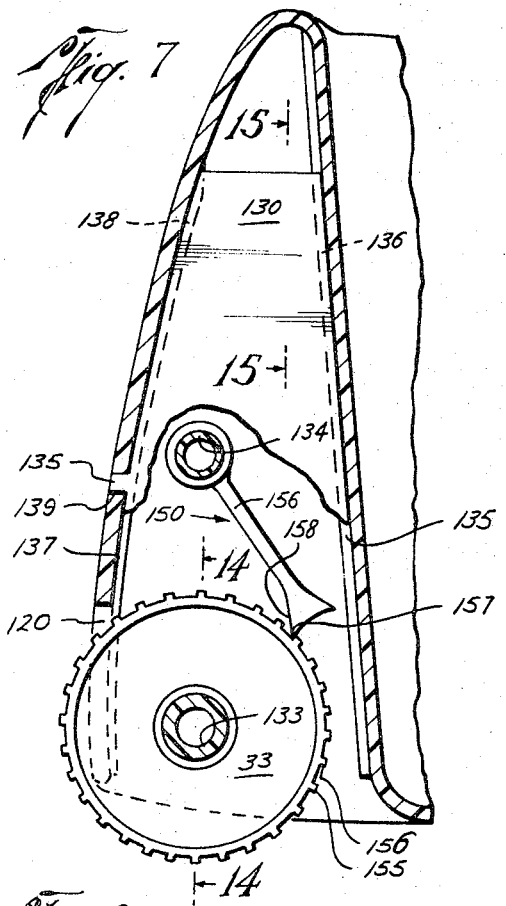
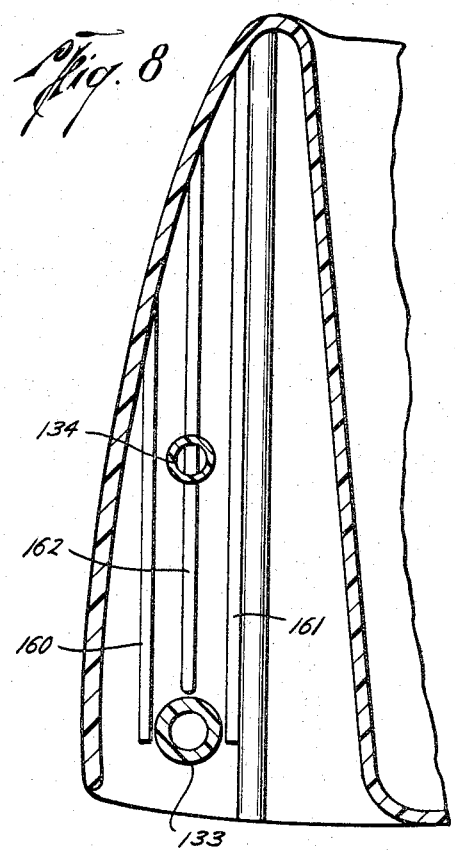
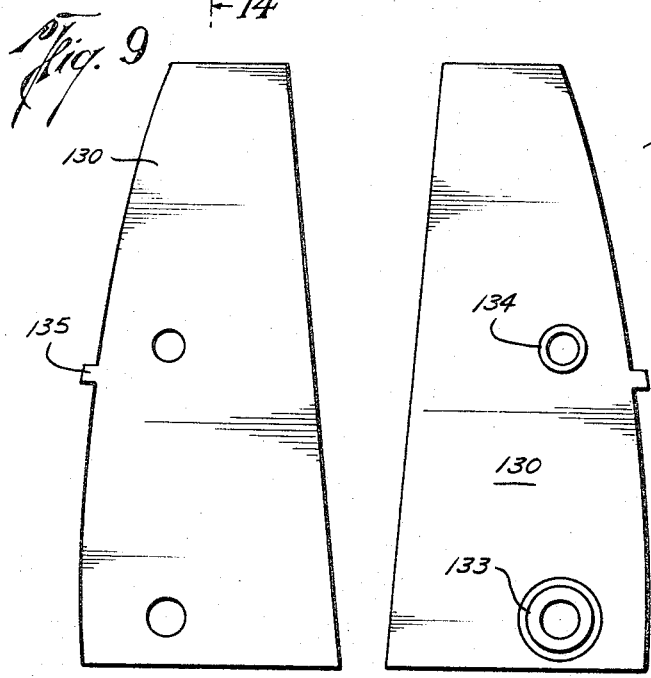
Jerome Gould
Lew W. Throssel
Knud A. Jensen
Orville E. Kuhlman
     INVENTORS
BY
Murray Robinson
          ATTORNEY Aug. 29, 1967   J. GOULD ET AL   3,338,590
BABY CARRIER
Filed May 18, 1965   4 Sheets-Sheet 4
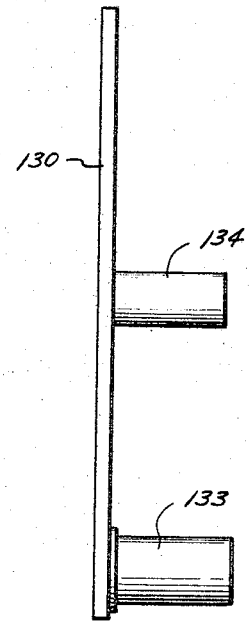
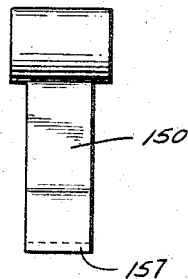
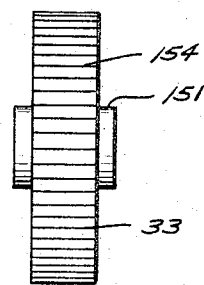
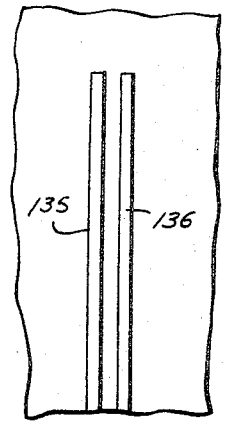
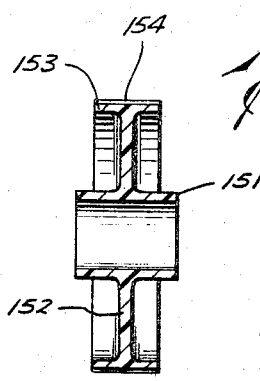
Jerome Gould
Lew W. Throssel
Knud A. Jensen
Orville E. Kuhlman
INVENTORS
BY Murray Robinson
ATTORNEY United States Patent Office 3,338,590
Patented Aug. 29, 1967

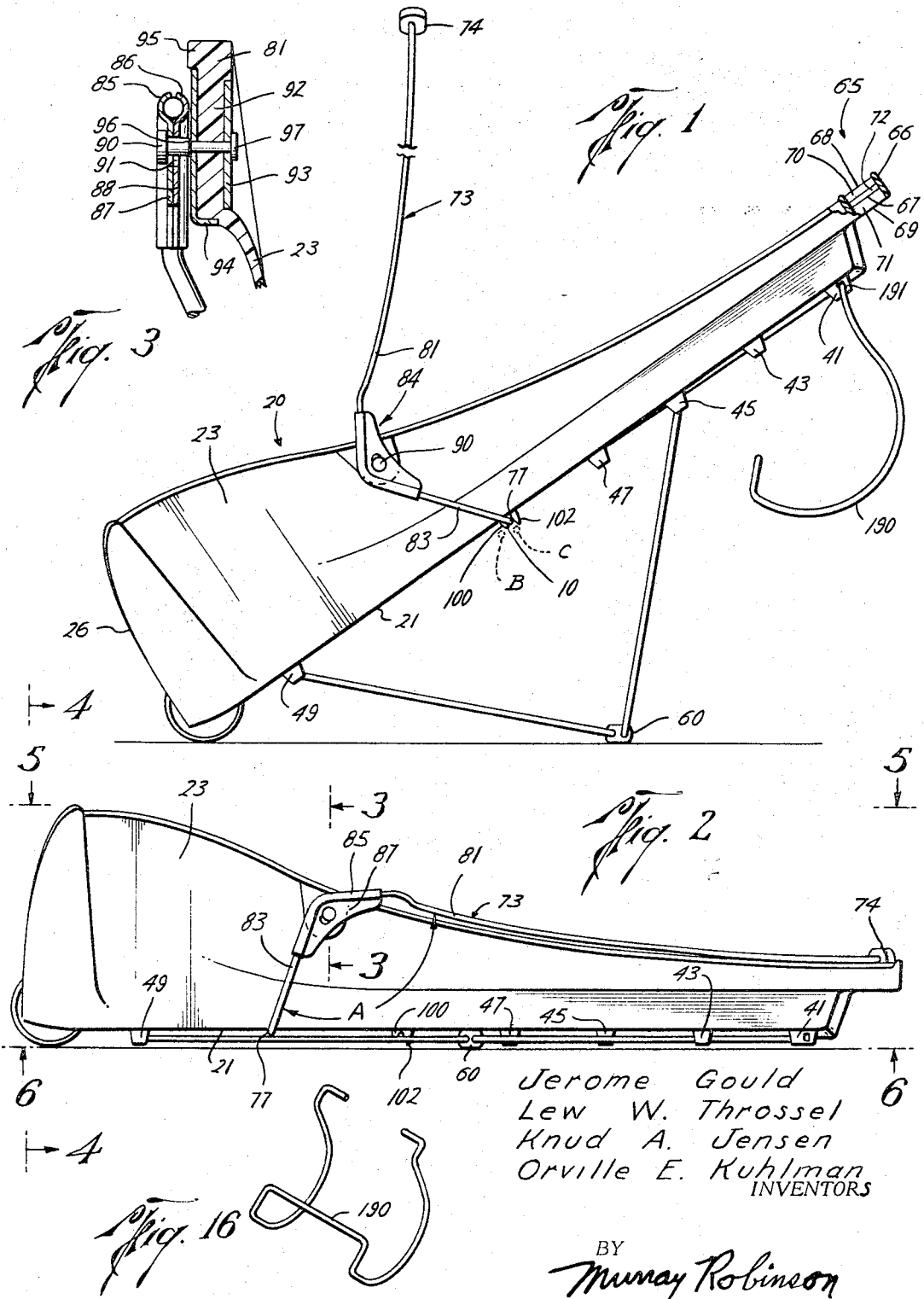

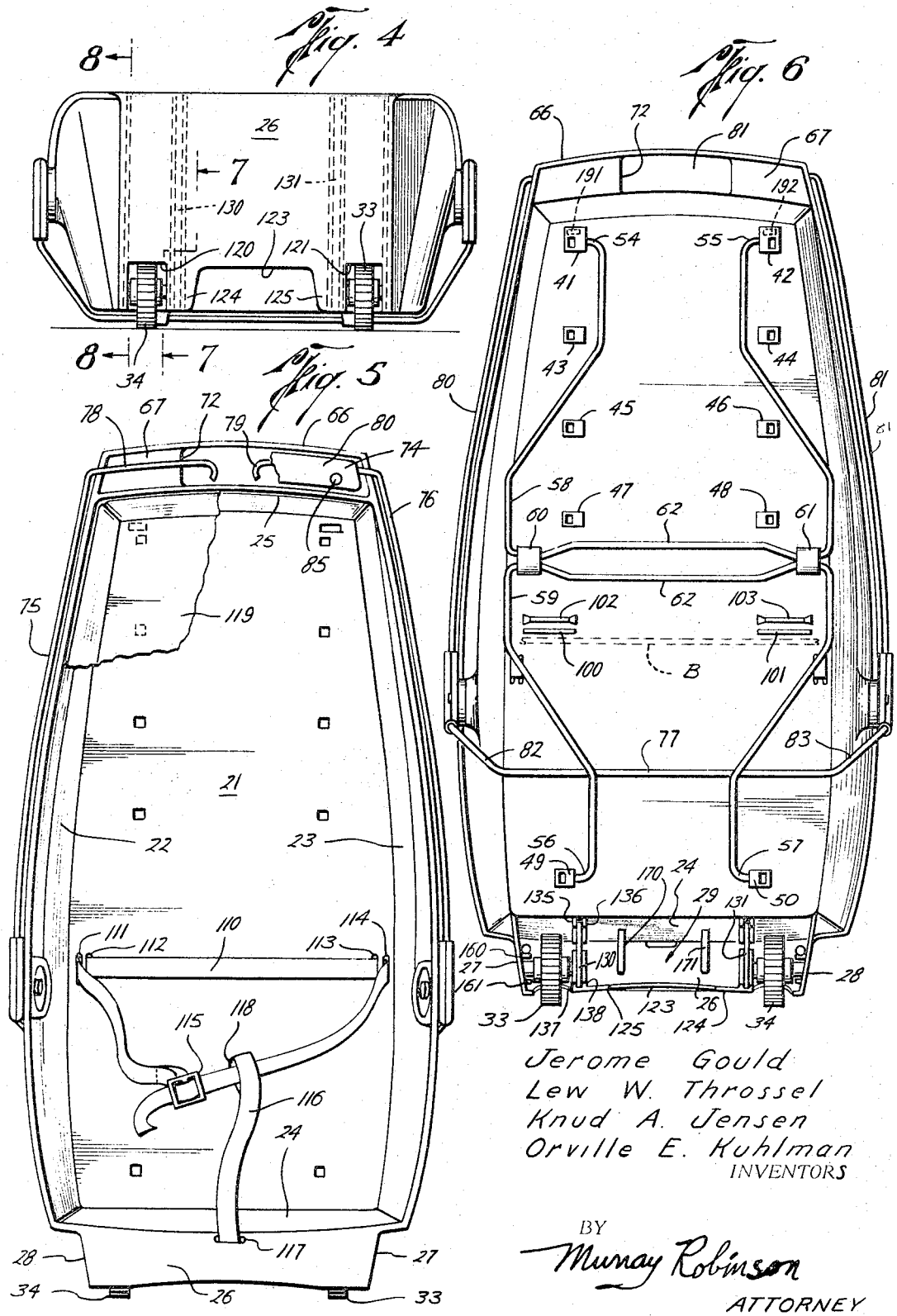

3,338,590
BABY CARRIER
Jerome Gould, Encino, Calif., Lew W. Throssel and Knud A. Jensen, Eldora, Iowa, and Orville E. Kuhlman, Kansas City, Mo., assignors to Infanseat Company, Eldora, Iowa, a corporation of Iowa
Filed May 18, 1965, Ser. No. 456,771
18 Claims. (Cl. 280—47.25)

ABSTRACT OF THE DISCLOSURE

A baby carrier having a shell, support stand and wheels, said wheels being insertable and removable and having means for permitting said wheels to be rotated in a single direction.

Description

This invention pertains to baby carriers. Apparatus of this general type is shown in Patents 2,324,421—Ouellette (1943), 2,346,989 — O'Brien (1944), 2,661,959—Bell (1953), 3,101,972—Laughlin (1963).

It is the principal object of the invention to provide a baby carrier including wheel means by which the baby carrier can be easily moved about when desired, the wheel means being locked against rotation relative to the carrier corresponding to forward movement of the carrier so that the carrier will be stable when in position leaning against a support, will have increased stability when supported by a stand affixed to the carrier shell and will have better stability when the carrier is being lowered to the floor after having been carried by means of a bail attached to the carrier shell.

Other objects and advantages of the invention will become apparent from the following description thereof.

Briefly the invention includes a resilient plastic shell or body including back, bottom and sides. To the back of the shell is connected an adjustably positioned support stand and a car seat hook. To the sides of the shell is pivotally connected a bail, or handle, by means of which the carrier can be carried about. Adjacent the juncture of the back and bottom of the shell are wheel means which may be removable, e.g. two wheels, mounted for rotation about an axis parallel to the juncture of the back and bottom of the carrier. Locking means are provided in the form of pawls engageable with teeth on the wheels to prevent rotation of the wheels in a direction corresponding to forward movement of the carrier on the floor, i.e. the carrier may be prevented from rolling forward. The wheels and pawls are mounted in a pocket or well formed between the bottom of the shell and a veil extending rearwardly and downwardly from the front edge of the bottom of the shell toward the rear of the shell. Slips or wedge shaped webs of plastic are insertably positioned in the well, the slips carrying axles on which the wheels and pawls are mounted.

For a detailed description of a preferred embodiment of the invention reference will now be made to the accompanying drawings wherein:

FIGURE 1 is a side view of a baby carrier embodying the invention;

FIG. 1 is a view similar to FIGURE 1 showing the carrying bail and support stand retracted, the car seat hook removed, and the carrier laid on its back;

FIGURE 3 is a section taken at plane 3—3 of FIGURE 2;

FIGURE 4 is a bottom view of the carrier, taken on plane 4—4 of FIGURE 2;

FIGURE 5 is a front view of the carrier taken on plane 5—5 of FIGURE 2;

FIGURE 6 is a back view of the carrier taken on plane 6—6 of FIGURE 2;

FIGURE 7 is a section taken at plane 7—7 of FIGURE 4;

FIGURE 8 is a section taken at plane 8—8 of FIGURE 4;

FIGURE 9 is a detail showing one of the slips for supporting the wheels, viewed similarly to FIGURE 7;

FIGURE 10 is a detail showing the opposite side of the slip shown in FIGURE 9;

FIGURE 11 is an edge view of the slip shown in FIGURES 10 and 11;

FIGURE 12 is a detail showing one of the pawls viewed in position corresponding to the position of the slip shown in FIGURE 11;

FIGURE 13 is a detail showing one of the wheels positioned correspondingly to the pawl of FIGURE 12;

FIGURE 14 is a sectional view through one of the wheels taken on plane 14—14 of FIGURE 7;

FIGURE 15 is a fragmentary view taken on plane 15—15 indicated in FIGURE 7, and with the slip, pawl, and wheel removed;

FIGURE 16 is a perspective view of the car seat hook.

Referring now to FIGURES 1 through 6 there is shown a baby carrier including a tub shaped shell 20, preferably molded of a resilient plastic material such as polyethylene, polyurethane, or preferably polypropylene. If desired the shell may be perforated for weight reduction, conservation of material, ventilation, and ornamental appearance. As best shown in FIGURES 5 and 6 the shell includes a back 21, sides 22, 23, bottom 24, and top 25. The sides converge somewhat at the top so that the top is narrow to confine the baby's head laterally while the bottom is wide enough to receive the baby's hips when padded with diapers and pants and the mid portion is wide enough to receive the baby's shoulders. As best shown in FIGURES 1 and 2, the sides of the carrier are deepest adjacent the bottom of the carrier and shallower at the top, thereby enabling the baby to extend its arms out over the sides of the carrier and to look out over the sides.

Extending rearwardly from the lower front edge of the shell at an acute angle to bottom 24 is a veil 26. As best shown in FIGURE 6 bottom 24 and veil 26 are joined at their sides by walls 27, 28 forming therewith a rearwardly opening pocket 29 in which are rotatably mounted wheels 33, 34. Locking means is provided preventing the wheels from rotation in the direction corresponding to forward motion of the carrier but allowing wheel rotation in the direction corresponding to rearward motion of the carrier, i.e. looking at FIG. 1, the wheels could not rotate in a counter-clockwise direction but could in a clockwise manner. The wheel mounting and the wheel locking means will be described in more detail subsequently herein.

As best shown in FIGURE 6, on the back of the shell are a plurality of pairs of laterally aligned sockets 41–42, 43–44, 45–46, 47–48, 49–50. Each socket comprises a boss formed on the back of the carrier having an opening on its inward side adapted to receive when desired one of the out-turned pin ends 54, 55, 56, 57 at the ends of U-shaped resilient steel rods 58, 59. The rods are double pivotally connected by two blocks 60, 61 each block having a pair of holes therethrough in which adjacent portions of the two rods are rotatably received. Central portions 62, 62′ of the rods are displaced out of alignment with the portions of the rods in the blocks so as to form shoulders preventing lateral shifting of the blocks.

In FIGURES 2 and 6 the rods 58, 59 are shown positioned flat against the bottom of the carrier, pins 54–57 being received in the sockets 41–42 and 49–50 nearest the top and bottom of the carrier. In this position the rods are out of the way as is desirable when the carrier is to be held in the arms of the baby's attendant. By squeezing together the arms of U-shaped rod 58 its pins 54, 55 can be released from sockets 41–42 and reinserted in another pair of sockets such as sockets 45–46, thereby positioning the rods 58, 59 to form a support stand as shown in FIGURE 1. If it is desired to increase the angle of the back of the carrier relative to the horizontal, the rod pins 54, 55 can be placed in sockets 47, 48, or if a lesser angle is desired the pins can be placed in sockets 43, 44 on the back of the carrier.

When the carrier is supported by the stand the blocks 60, 61 adjust themselves to rest flat on the floor. The blocks 60, 61, together with wheels 33, 34 provide four points of support for the carrier. If it is desired to move the carrier on the floor, the top end of the carrier can be grasped to lift the blocks 60, 61 off the floor, thereby placing all of the weight on the wheels, and the carrier can then be rolled backward to the desired position and set down again on the blocks 60, 61. To facilitate lifting the carrier at its upper end and pulling or pushing it to the desired new location, a gripping means 65 is formed adjacent the top 25.

As best shown in FIGURES 1, 5, and 6, the gripping means 65 comprises a U-shaped plastic strap 66 integral with the rest of shell 20. A web 67 extends from top 25 in a plane parallel to the back 21 of the carrier inside strap 66 about midway between the front and back edges 68, 69 thereof, forming front and back channels 70, 71. Additionally, there is a laterally elongated opening 72 in web 67; the opening 72 being about the width of four fingers of a human hand. With this arrangement, when the carrier is in the position shown in FIGURE 1, the attendant can grasp the gripping means 65 from either the front or back with the fingers passing into opening 72. If the bail 73 of the carrier is retracted, with its handgrip 74 received in pocket 70, the gripping means 65 can be conveniently engaged by the attendant placing his fingers in the back channel 71 and his thumb on top of handgrip 74. When it is desired to elevate the bail, the attendant can push his fingers up through opening 72 to force the handgrip 74 out of channel 70 into position where handgrip 74 can be easily grasped.

As best shown in FIGURES 1, 2, and 6 the bail 73 comprises a steel rod formed of two bell cranks 75, 76 joined at one end by transverse bar 77 and provided at the other end with inturned L-shaped pins 78, 79. The handgrip 74 is formed of two hollow plastic halves 80', 81' connected by rivets such as that shown at 85'. The ends of L-shaped pins 78, 79 engage inside the adjacent rivets (not shown) to prevent the pins from being pulled out of the holes at each end of the handgrip. Internal webs strengthen the handle without unduly increasing its weight.

At the angles between the upper arms 80, 81 and lower arms 82, 83 of the bell cranks there are gussets 84 (see FIGURES 1 and 2). As best shown in FIGURE 3, each gusset includes two parts. Each part includes flat web part and a semitubular part. The semitubular parts 85, 86 fit over the bail rod and the flat webs 87, 88 are spot welded together. The bail 73 is rotatably mounted on pivots 90 formed by rivets passing through the sides 22, 23 of the carrier and through elongated openings or slots 91 in the gussets 84 on the bail. The openings are elongated in a direction perpendicular to the back of the carrier.

Referring now particularly to FIGURE 3, the portions 92 of the sides of the carrier through which pass pivots 90 are thickened to provide sufficient strength to hold the pivots. The thickened portions 92 lie in planes parallel to each other and perpendicular to the back so that the pivots 90, which are perpendicular to the portions 92, may be coaxial to prevent binding of the bail as it rotates from one position to another. The portions 92 thus lie at a slight angle to the sides 22, 23 which converge toward the back of the carrier.

For added strength a metal washer 93 is disposed over the inner face of thickened portion 92 and a cap 94 is disposed over the outer face of portion 92 underneath bead 95 that extends along the front edge of the sides of the carrier. The pivot 90 is in the form of a metal rivet and includes a shoulder 96 which bears against cap 94, the inner end of the rivet being deformed to a flange 97 bearing against the washer 93. The rivet is thus fixedly mounted against cap 94 and washer 93 which distributes bending moments and axial stresses on the pivot through a large area of the thickened portion 92 of the plastic shell of the carrier. Also, the caps 94 distribute to the beads 95 some of the load transverse to the pivots 90. By these means no stress is imposed on the shell in excess of the strength of the plastic in ordinary use of the carrier.

When the bail 73 is in the retracted position shown in FIGURE 2, the transverse bar 77 lies across the back of the carrier closely adjasent thereto so as not to prevent the support stand 58–61 from being positioned substantially flat against the back of the carrier. The angle A (FIGURE 2) between the upper and lower arms of the bell cranks is such that when bar 77 of the bail is flat against the back of the carrier, and in a retracted position the handgrip 74 is nested in pocket 70 at the top of the carrier.

Referring to FIGURE 1, when the bail 73 is first elevated the weight of the bail causes it and the gussets mounted thereon to move down to the limit allowed by slots 91, the tops of the slot resting on pivots 90. At this time the transverse bar 77 will be in the position shown in dotted lines at B bearing against the bottoms of transverse ribs 100, 101 (see also FIGURE 6) on the back of the carrier. With a slight pressure the bar can be forced past ribs 100, 101 into the dotted line position shown at C in FIGURE 1. In this position the bar lies in the channel or recess formed between ribs 100, 101 and ribs 102, 103 parallel to ribs 100, 101. Ribs 102, 103 are of greater height than ribs 100, 101 so that the bar 77 cannot be forced past ribs 102, 103. In this manner bar 77 is snapped into a locked position between ribs 100, 101 and ribs 102, 103. The ribs 100–103 thus provide a releasable locking means.

When the bail 73 is lifted to pick up the carrier, the bail first moves up relative to the carrier shell to the position shown in FIGURE 1. In this position the bar 77 is in contact with the back of the carrier so that it can take some of the weight of the carrier when it is lifted off the floor. At the same time the pivots 90 are in engagement with the bottoms of the slots 91 so that some of the weight of the carrier is taken by the gussets 84 and pivots 90.

By reversing the procedure just described the bail 73 can be rotated to the retracted position. When the carrier is set down the weight of the bail causes the bail to move to the position shown at C, FIGURE 1. If it does not move automatically a slight downward pressure on the bail will move it to the C position. Thereafter the bail can be rotated to force bar 77 past ribs 100, 101 and then returned to the FIGURE 2 position.

It is to be noted that the angle A between the upper and lower arms of the bell cranks of the bail is such that when the bar 77 is in the recess between ribs 100, 101 and 102, 103 and against the back of the carrier as shown in FIGURE 1, the upper arms of the bell cranks are nearly perpendicular to the plane defined by the wheels 33, 34 and blocks 60, 61 when the support stand is adjusted as shown in FIGURE 1. Thus, when the carrier is resting on the floor supported by the stand adjusted to its intermediate position as shown in FIGURE 1, the upper arms of the bell cranks of the bail are approximately vertical. If the stand is adjusted to position the back of the carrier at a greater or lesser inclination, the upper arms of the bail bell cranks will still be near to vertical. The handgrip 74 is thus always disposed at near maximum height when the bail is upright, thereby making it easy to pick up the carrier without much stooping. To achieve this result the angle A (FIGURE 2) of the bell cranks must be equal to the angle between the upper arms of the bell crank when in retracted position and a line from the pivot perpendicular to the back of the carrier plus one-half the angle between vertical and the position of the upper part of the bail in retracted position when the carrier is setting on the floor with the stand in the intermediate position.

If the carrier is lifted off the floor, the center of gravity of the carrier and baby will usually be such as to put the upper arms of the bell cranks in near vertical position. Therefore, there will be little or no rocking of the carrier when it is lifted off the floor or set down if the stand is in the intermediate position shown in FIGURE 1. It is to be noted that this result is not due to the fact that the upper arms of the bail bell cranks are vertical in both cases but rather that they are in the same position both with the carrier off the floor and on the floor that prevents the rocking motion. If it is found that with a particular baby the bail is at an angle to the vertical when lifted off the floor, e.g. inclined upwardly rearwardly, the stand can be adjusted to another position, e.g. to a lesser angle to the horizontal so as to eliminate rocking at take off and set down.

When the carrier is off the floor, the shell of the carrier, if supported by the bail solely at pivots 90, would be unstable, being free to rock forward or backward. The transverse bar 77, however, engaging the back of the carrier, positively prevents backward rocking of the shell. The ribs 100, 101 engage the bar 77 to positively prevent forward rocking of the shell. The importance of the bar 77 and the locking thereof above ribs 100, 101 is thus apparent.

It is also to be noted that since the shell of the carrier is supported both forwardly by pivots 90 and rearwardly by transverse bar 77, so long as the center of gravity of the shell and baby lies between vertical planes through pivots 90 and bar 77 there is no tendency at all for the shell to rock forwardly or backwardly, and the pivots 90 and bar 77 are so placed on the carrier as to insure that normally the center of gravity of the carrier and baby does lies therebetween.

With the shell of the carrier rigidly positioned relative to the bail, it remains to anchor the baby to the shell. This is accomplished by means of waist strap 110 passing through slots 111, 112, 113, 114 and connected at its ends by buckle 115. Also, there is a crotch strap 116 passing through slot 117, secured behind the veil by a suitable enlargement. At the upper end of the crotch strap is a loop 118 through which passes the waist strap. For the baby's comfort a pad 119 (shown only in part) may be provided inside the shell covering the back, bottom, top and parts of the sides.

Referring now to FIGURES 4, 6, and 7, the veil 26 is slotted at 120, 121 adjacent each of the wheels 33, 34 to allow the wheels to protrude rearwardly beyond the veil, and the veil is cut away at 123 between the wheels. This results in the formation of resilient tongues 124, 125. Each of the wheels 33, 34 is mounted between one of the end walls 27, 28 and the adjacent slip 130, 131. As shown in FIGURES 9, 10, and 11, slip 130 is a wedge shaped plastic sheet and includes hollow stub shafts 133, 134 integral therewith. There is a projection 135 extending out from one edge of the slip. Referring again to FIGURES 4, 6, and 7, the slip 130 is slid into channels formed in the bottom 24 and veil 26 by pairs of ribs 135′, 136 and 137, 138 (see also FIGURE 15). The ribs 137, 138, it will be noted, are formed on the inside of resilient tongue 124 which springs out as the slip is inserted, allowing projection 135 to pass. The projection 135 snaps into aperture 139 in the veil 26 (see FIGURE 7). Prior to sliding the slip 130 into position, wheel 33 and pawl 150 (see FIGURE 13) are slipped onto stub shafts 133, 134 so that the resultant assembly is as appears in FIGURE 7.

As best shown in FIGURES 13 and 14 wheel 33 includes a tubular bearing 151, a disc portion 152 and a rim 153. The outer periphery of the rim is provided with a set of teeth 154 annularly disposed therearound. The teeth 154 are preferably oblate, that is rounded or flattened on their ends, so as not to scratch the floor or other surface on which they rest. Preferably they are flat on their ends 155 with right angle shoulders 156 as best shown in FIGURE 7. The right angle shoulders cooperate with the pointed end 157 of pawl 150 to prevent forward motion of the wheels. On rearward motion of the wheels, that is, motion of the wheels corresponding to rearward motion of the carrier, the side 158 of the pawl rides over teeth 154 without interference. In other words, when the wheels rest on the floor, the device may be pulled, but not pushed.

In assembling the slip 130 into pocket 29, the shaft 133 slides into the channel formed between ribs 160, 161 (see FIGURES 6 and 8) and comes to rest against a stop formed by the end of rib 162. This gives end support to the wheel shaft. The pawl shaft 134, which is shorter than shaft 133, rides over rib 162 and is given end support thereby when it comes to rest in the position shown in FIGURE 8.

The ribs 135′, 136, 137, 138 and 160, 161, 162 serve additionally to strengthen the shell of the carrier where it supports the wheels, and the slip 130 serves to brace the bottom 24 of the shell to the veil 26. Additional bracing is provided by webs 170, 171 disposed in the pocket extending between the bottom and veil.

The slip 131, wheel 34, and the pawl (not shown) associated with wheel 34, forming therewith locking means, and the ribs in which they are mounted, are in all respects the same as slips 130 except that one slip is left handed and the other right handed, the stub shafts extending from the opposite side of slip 131 than from slip 130.

It will be apparent from the foregoing that the wheel means including wheels 33, 34 and the locking means including the pawl 150 and the like pawl associated with wheel 34 provide a stable support for the lower end of the baby carrier, whether it be braced up by the carrier's own stand as shown in FIGURE 1 or whether the stand is retracted (as shown in FIGURE 2) and the carrier is braced by the back of a chair, bed post, or wall. Especially in the latter case it is necessary that the wheel means be locked against forward movement to allow the carrier to be braced in such manner. The locking means also prevents the carrier from skooting forward when it is set down after being carried by the bail as shown in FIGURE 1. The locking means is also helpful to achieve greater stability when the carrier is braced in a chair or automobile seat and a hook 190 (see FIGURES 1 and 16) is used to secure the upper end of the carrier to the chair or auto seat back. Note that as shown hook 190 is pivotally mounted in an additional set of apertures 191, 192 in the same bosses on the back of the carrier (see FIGURE 6) as provide sockets 41, 42. With this arrangement the support stand need not be removed to make use of the seat hook.

While a preferred embodiment of the invention has been shown and described, many modifications thereof can be made by one skilled in the art without departing from the spirit of the invention.

That being claimed is:

1. A baby carrier comprising a shell including a back, bottom, and sides, and adapted to be braced in position with the back inclined at an angle between horizontal and vertical and with the part of the back adjacent its juncture with the bottom lowermost and the rest of the back extending upwardly and rearwardly therefrom and with the bottom extending upwardly and forwardly from said juncture, wheel means mounted adjacent said juncture for rotation about an axis parallel to said juncture, and locking means preventing rotation of the wheel means in a direction corresponding to forward motion of said juncture while allowing rotation of the wheel means in a direction corresponding to rearward motion of said juncture whereby said shell can be more stably supported on said wheel means when braced in said position with the back inclined as aforesaid, said locking means including spaced teeth formed as a portion of the periphery of said wheel means and teeth engaging pawl means.

2. Combination according to claim 1, wherein said spaced teeth are oblate in shape and said pawl means includes a pawl pivotally mounted for engagement with the periphery of said wheel means.

3. A baby carrier comprising a shell including a back, bottom and sides and adapted to be braced in position with the back inclined at an angle between horizontal and vertical and with the part of the back adjacent its juncture with the bottom lowermost and the rest of the back extending upwardly and rearwardly from said juncture, wheel means mounted adjacent said juncture for rotation about an axis parallel to said juncture, and locking means preventing rotation of the wheel means in a direction corresponding to forward motion of said juncture while allowing rotation of the wheel means in a direction corresponding to rearward motion of said juncture whereby said shell can be more stably supported on said wheel means when braced in said position with the back inclined as aforesaid; wherein said shell includes a veil extending rearwardly and downwardly from adjacent the front edge of the bottom of the shell toward the back of the shell at an angle to said bottom forming with said bottom a pocket, said wheel means and locking means being mounted in said pocket.

4. Combination according to claim 3 wherein said wheel means includes a pair of wheels, and including a pair of slips inserted in said pocket extending from the bottom of the shell to the veil, each slip carrying an axle on which one of said wheels is mounted.

5. Combination according to claim 4 wherein said wheels each carry a set of teeth disposed annularly with respect to the axle on which it is mounted, and said slips each include another axle on which is pivotally mounted a pawl cooperating with the adjacent set of teeth.

6. Combination according to claim 4 wherein said slips are each slidably received between a channel on the bottom of the shell and a channel on said veil, and said pocket includes side walls extending from said bottom to said veil, each side wall including a channel receiving the end of one of said axles.

7. Combination according to claim 6 wherein each of said slips includes a projection along one edge thereof and said veil includes apertures adapted to receive said projections, said veil being cut away between said wheels to increase the resiliency of the portion adjacent the wheels to permit insertion of said slips and to interlock with the projections when they move into said apertures.

8. The device of claim 3 wherein said baby carrier also includes transporting means pivotally attached to said sides, said transporting means being capable of assuming a retracted position and a further position near vertical with respect to a supporting surface on which the carrier is placed.

9. The device of claim 8 wherein said back includes means for releasably locking said transporting means in said near vertical position.

10. The device of claim 8 including a support stand for said baby carrier, said stand engageable with a plurality of pairs of pivot receiving means on said back, and, when engaged with said receiving means, encompassing a portion of said hand grip means between said stand and said back.

11. The device of claim 10 wherein said plurality of receiving means on said back permit said stand to rest flat against said back as well as in intermediate positions, and when said stand is in at least one intermediate position, said hand grip may move from a position along said sides to a position near vertical with respect to said surface, but when said stand is flat against said back, said hand grip may not so move.

12. The device of claim 11 wherein recessed placement means are provided said shell for receiving a portion of said hand grip means when same is in a retracted position.

13. Baby carrier of claim 3 having:
   movably positionable bail means for hand carrying said carrier.

14. The device of claim 13 wherein said locking is effected by pawl means and said bail means is releasably locked in one position by blocking means.

15. The device of claim 13 wherein said blocking means include projections on said back.

16. The device of claim 13 wherein recessed receiving means are provided adjacent said top for receiving a portion of said bail means.

17. The device of claim 13 wherein a supporting stand is provided said carrier, said supporting stand being engageable with said back in a plurality of positions, one of said positions placing said stand flat against said back.

18. The device of claim 17 wherein when said stand is in said flat position, said bail means is barred from moving.

References Cited

UNITED STATES PATENTS

| | | | |
|---|---|---|---|
| 667,575 | 2/1901 | Raynor | 188—30 |
| 1,723,237 | 8/1929 | Holanbek | 188—30 X |
| 2,005,528 | 6/1935 | Berchuk | 220—96 |
| 2,661,959 | 12/1953 | Bell | 280—47.25 |
| 2,990,190 | 6/1961 | Eriksen | 280—47.25 X |
| 3,101,972 | 8/1963 | Laughlin | 297—310 X |
| 3,258,291 | 6/1966 | Ezquerra | 297—183 X |

BENJAMIN HERSH, *Primary Examiner.*

MILTON BUCHLER, *Examiner.*

J. A. PEKAR, *Assistant Examiner.*